United States Patent
Norrman et al.

(10) Patent No.: US 10,165,492 B2
(45) Date of Patent: Dec. 25, 2018

(54) METHODS AND NETWORK NODES FOR MULTI-CONNECTIVITY HANDLING IN A COMMUNICATION SYSTEM

(71) Applicant: Telefonaktiebolaget LM Ericsson (publ), Stockholm (SE)

(72) Inventors: Karl Norrman, Stockholm (SE); Rui Fan, Beijing (CN); Johan Rune, Lidingö (SE); Gunnar Mildh, Sollentuna (SE); Rasmus Axén, Linköping (SE); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 15/038,351

(22) PCT Filed: Apr. 18, 2016

(86) PCT No.: PCT/EP2016/058566
§ 371 (c)(1),
(2) Date: May 20, 2016

(87) PCT Pub. No.: WO2017/162309
PCT Pub. Date: Sep. 28, 2017

(65) Prior Publication Data
US 2018/0084475 A1    Mar. 22, 2018

Related U.S. Application Data

(63) Continuation of application No. PCT/CN2016/077016, filed on Mar. 22, 2016.

(51) Int. Cl.
*H04W 40/02* (2009.01)
*H04L 12/04* (2006.01)
(Continued)

(52) U.S. Cl.
CPC ............ *H04W 40/02* (2013.01); *H04L 69/22* (2013.01); *H04W 12/02* (2013.01); *H04W 12/04* (2013.01); *H04W 76/15* (2018.02); *H04L 69/323* (2013.01)

(58) Field of Classification Search
CPC ..... H04W 40/02; H04W 76/15; H04W 76/25; H04L 69/22; H04L 69/323
See application file for complete search history.

(56) References Cited

U.S. PATENT DOCUMENTS

2009/0041247 A1*  2/2009  Barany ................... H04L 63/06
                                                              380/270
2016/0050186 A1*  2/2016  Liu ....................... H04L 63/0428
                                                              713/150

(Continued)

FOREIGN PATENT DOCUMENTS

WO    WO 2009/021219 A2    2/2009
WO    WO 2015/020449 A1    2/2015

OTHER PUBLICATIONS

International Search Report, International Application No. PCT/EP2016/058566, dated Nov. 2, 2016.
(Continued)

*Primary Examiner* — Paul H Masur
(74) *Attorney, Agent, or Firm* — Sage Patent Group (57) ABSTRACT

A method of multi-connectivity handling in a communication system is disclosed. The method may be performed in a first network node and comprises: generating a data protocol packet destined to a communication device, and including in the data protocol packet at least one identifier identifying data protocol processing context and the first network node. Methods in a second network node and in a communication device are also disclosed, as are first and
(Continued)

second network nodes, communication device, computer programs and computer program products.

34 Claims, 5 Drawing Sheets

(51) Int. Cl.
*H04L 12/02* (2006.01)
*H04W 12/02* (2009.01)
*H04W 12/04* (2009.01)
*H04W 76/15* (2018.01)
*H04L 29/06* (2006.01)
*H04L 29/08* (2006.01)

(56) References Cited

U.S. PATENT DOCUMENTS

| | | | |
|---|---|---|---|
| 2016/0065362 A1* | 3/2016 | Choyi | H04L 63/065 380/279 |
| 2016/0191471 A1* | 6/2016 | Ryoo | H04W 12/04 455/411 |
| 2016/0285716 A1* | 9/2016 | Pelletier | H04L 5/0098 |
| 2017/0156060 A1* | 6/2017 | Wu | H04L 63/061 |
| 2017/0272985 A1* | 9/2017 | Axen | H04W 36/0038 |

OTHER PUBLICATIONS

Written Opinion of the International Searching Authority, International Application No. PCT/EP2016/058566, dated Nov. 2, 2016.

\* cited by examiner

METHODS AND NETWORK NODES FOR MULTI-CONNECTIVITY HANDLING IN A COMMUNICATION SYSTEM

CROSS REFERENCE TO RELATED APPLICATIONS

This application is a 35 U.S.C. § 371 national stage application of PCT International Application No. PCT/EP2016/058566, filed on Apr. 18, 2016, which itself is a continuation of PCT International Application No. PCT/CN2016/077016, filed Mar. 22, 2016, the disclosure and content of both of which are incorporated by reference herein in their entireties.

TECHNICAL FIELD

The technology disclosed herein relates generally to the field of communication systems, and in particular to methods of multi-connectivity handling in a communication system, network nodes, computer programs and computer program products.

BACKGROUND

Long Term Evolution (LTE) dual connectivity is a feature wherein a user equipment (UE) is simultaneously connected to and provided with radio resources by two different network nodes: by a Master evolved Node B (MeNB) and by a secondary eNB (SeNB). This possibility for the UE to connect to two network nodes gives several advantages such as, for instance, increased data rate, increased network capacity and improved spectrum utilization.

There are different scenarios for the LTE dual connectivity feature, in view of control plane architecture as well as user plane architecture. For instance, the user traffic may be split at a core network level (e.g. in a serving gateway, S-GW) or at a radio network level (e.g. in the MeNB). Splitting in the S-GW entails disadvantages such as security being affected as ciphering is required both at the MeNB and the SeNB, while splitting at MeNB level has disadvantages such as all dual connectivity traffic having to be routed, processed and buffered in the MeNB. In the latter scenario flow control is also required between the MeNB and the SeNB.

From the above it is clear that there are many issues that need to be considered when implementing and also improving dual connectivity features.

SUMMARY

An objective of the present teachings is to address and improve various aspects for the above mentioned dual connectivity feature and for a generalized corresponding multi-connectivity feature disclosed herein. A particular objective is to enable flexibility in view of e.g. bearers for dual connectivity as well as multi-connectivity. This objective and others are achieved by the methods, network node, communication device, computer programs and computer program products according to the appended independent claims, and by the embodiments according to the dependent claims.

The objective is according to an aspect achieved by a method of multi-connectivity handling in a communication system. The method is performed in a first network node and comprises generating a data protocol packet destined to a communication device, and including in the data protocol packet at least one identifier identifying data protocol processing context and the first network node.

The method brings about several advantages. For instance, the method enables the separation of data protocol entities from their delivery mechanism, e.g. separation of Packet Data Convergence Protocol (PDCP) entities from Radio Link control (RLC)/Media Access Control (MAC)/Physical Layer (PHY) in LTE. This in turn enables the communication device to connect to multiple network nodes on the RLC/MAC/PHY level, but connect on the PDCP/RRC level to other network nodes.

The method also enables a more flexible bearer handling in the network nodes. This is particularly useful in virtualized implementations where the protocol layers of the network nodes are more likely to be split and located at physically different network nodes.

The objective is according to an aspect achieved by a computer program for a first network node for multi-connectivity handling in a communication system. The computer program comprises computer program code, which, when executed on at least one processor on the first network node causes the first network node to perform the method as above.

The objective is according to an aspect achieved by a computer program product comprising a computer program as above and a computer readable means on which the computer program is stored.

The objective is according to an aspect achieved by a first network node for multi-connectivity handling in a communication system. The first network node is configured to: generate a data protocol packet destined to a communication device, and include in the data protocol packet at least one identifier identifying data protocol processing context and the first network node.

The objective is according to an aspect achieved by a method of multi-connectivity handling in a communication system. The method is performed in a second network node and comprises receiving a data protocol packet, and determining destination of the data protocol packet based on at least one identifier in the data protocol packet, the at least one identifier identifying data protocol processing context and the destination.

The objective is according to an aspect achieved by a computer program for a second network node for multi-connectivity handling in a communication system. The computer program comprises computer program code, which, when executed on at least one processor on the second network node causes the second network node to perform the method as above.

The objective is according to an aspect achieved by a computer program product comprising a computer program as above and a computer readable means on which the computer program is stored.

The objective is according to an aspect achieved by a second network node for multi-connectivity handling in a communication system. The second network node is configured to receive a data protocol packet, and determine destination of the data protocol packet based on at least one identifier in the data protocol packet, the at least one identifier identifying data protocol processing context and the destination.

The objective is according to an aspect achieved by a method of multi-connectivity handling in a communication system. The method is performed in a communication device and comprises generating a data protocol packet, and including in the data protocol packet at least one identifier identifying data protocol processing context and a receiving first network node.

The objective is according to an aspect achieved by a computer program for a communication device for multi-connectivity handling in a communication system. The computer program comprises computer program code, which, when executed on at least one processor on the communication device (causes the communication device to perform the method as above.

The objective is according to an aspect achieved by a computer program product comprising a computer program as above and a computer readable means on which the computer program is stored.

The objective is according to an aspect achieved by a communication device for multi-connectivity handling in a communication system. The communication device is configured to generate a data protocol packet, and include in the data protocol packet at least one identifier identifying data protocol processing context and a receiving first network node.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

One issue that is foreseen and solved by the present invention relates to security and will be described next. Control plane packets and user plane packets are processed in view of security, e.g. both types of packets are encrypted and, in LTE, at least control plane packets are also integrity protected when transmitted over the air interface. The control plane packets and the user plane packets are not protected by themselves, but the protection is rather left to a data protocol, such as Packet Data Convergence Protocol (PDCP) which resides at a lower layer in a protocol stack. PDCP is used as an exemplary data protocol, but other protocols are also possible, for instance Sub Network Dependent Convergence Protocol (SNDCP) or Link Layer Control (LLC) protocol. A network node and a user equipment (UE) agree on a base key from which they will derive necessary encryption and integrity protection keys. In the following, this key will be referred to as KEY (the KEY may, for instance, in case of LTE correspond to the KeNB defined in LTE specifications). The derived encryption and integrity protection keys are provided to the PDCP protocol which performs the encryption and integrity protection processing.

As mentioned in the background section, there are different scenarios for the LTE dual connectivity feature. In the following two such scenarios are described briefly.

Figure 1:
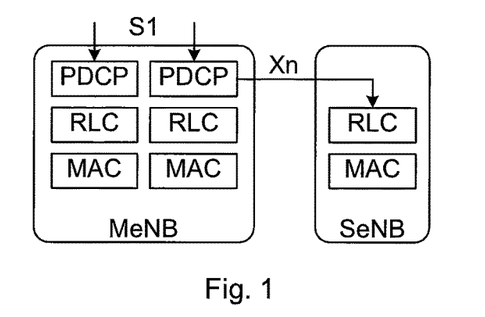
FIG. 1 illustrates a first LTE dual connectivity scenario.

FIG. 1 illustrates a first LTE dual connectivity scenario (denoted scenario 3C within the field). In this first dual connectivity scenario the two connectivity legs of a UE (a respective connection to the MeNB and the SeNB) split/join in a common PDCP layer. That is, the PDCP layer is the lowest protocol layer that is common to both connectivity legs. A single security KEY serve as basis for both the encryption and integrity protection keys of the PDCP packets, and that KEY is used for both connectivity legs. The KEY may be updated due to handovers and other events.

Figure 2:
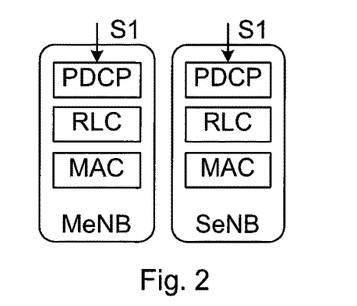
FIG. 2 illustrates a second LTE dual connectivity scenario.

FIG. 2 illustrates a second LTE dual connectivity scenario (denoted scenario 1A within the field). In this second dual connectivity scenario the two connectivity legs split/join in the core network, e.g. in the S-GW (not illustrated). The two connectivity legs thus have separate PDCP entities and use different security KEYs. To facilitate for the UE to differentiate between the different KEYs, the two connectivity legs are using different logical channels across the radio interface and this information can be propagated to higher protocol layers.

In the known LTE Dual Connectivity feature, the UE knows which KEY corresponds to which eNB, because there is only one KEY. Further, the UE can deduce which KEY to use for security processing of a given downlink PDCP packet from the logical channel on which a packet was received. Conversely, the UE can select which KEY to use for the security processing of uplink packets based on which logical channel the packet is to be sent.

Figure 3:
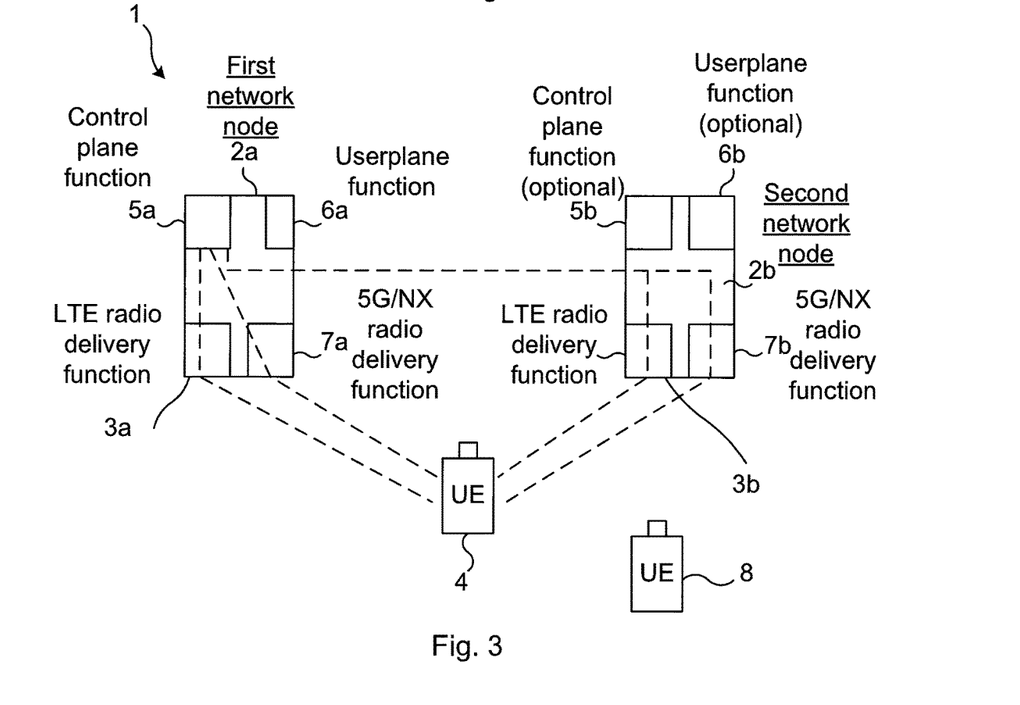
FIG. 3 illustrates schematically an environment in which embodiments according to the present teachings may be implemented.

However, in the herein suggested concept of multi-connectivity, e.g. described in relation to FIG. 3, the UE can no longer with certainty determine that a packet, e.g. a control plane packet, was protected by a particular network node simply from the logical radio channel on which the packets was received. Concretely, a packet received from a first network node may have been encrypted based on the KEY that the UE shares with a second network node. However, equally possible is that the packet was protected by the first network node and was delivered via the logical channel between the second network node and the UE.

Some foreseen possible shortcomings of the described 3GPP standardized LTE Dual Connectivity scenarios have been identified by the inventors. For instance, the first scenario (FIG. 1) does not allow for dynamic addition and deletion of bearers using different KEYS. In addition, the first scenario has a highly static master/slave relation-ship between the MeNB and the SeNB and the UE knows that all packets delivered via a logical channel of the SeNB are protected by MeNB. The first scenario does hence not allow different packets from the same PDCP flow to be delivered over different Data Radio Bearers (DRBs), and possibly even via different eNBs. In addition to the problems with identifying the correct security parameters such as encryption keys and which encryption algorithm to use, also non-security configuration parameters must be identified. Examples of non-security parameters comprise header compression context to compress/decompress user plane packet headers when transferred between the UE and the PDCP entity in one of the network nodes.

Other connectivity scenarios, may have corresponding shortcomings. For instance, the mentioned second LTE dual connectivity scenario (FIG. 2), has further shortcomings. For example, an offload decision cannot be taken by the RAN, but is rather controlled from a node in the core network (e.g. Mobility Management entity, MME). This leads to a less dynamic set-up and tear-down of offloaded bearers and hence increases signaling between the RAN and the core network. Existing solutions does not allow a UE nor a network node (e.g. an eNB) to identify which configuration parameters (e.g. KEYs) are required to process PDCP packets in a multi-connectivity scenario where PDCP packets can be protected in any network node, but are delivered via this or any other network node, and where addition of new DRBs and Signaling Radio Bearers (SRBs) and removal of existing ones is independent of the logical channel on which the packets are delivered.

Briefly, in view of the above, the present invention provides a solution, in various embodiments, wherein the sender, for instance a network node such as an eNB or UE, of the packet includes an identifier which the receiver, for instance UE or eNB, can correlate to the given processing context. Thereby the UE and the eNB are enabled to determine which configuration and state information to use when processing a particular data protocol (e.g. PDCP) packet. It is again noted that PDCP is used merely as an illustrative example, but that other protocols could alternatively be used. Further, in the following, LTE is used purely as an example when describing the various embodiments and hence the particular denotations for e.g. interfaces, nodes etc. mentioned should not be construed as limiting as the present teachings may be applied also for other technologies than LTE. The present teachings may be applied for a variety of wireless communication systems and standards, for example evolved LTE or a new 5G RAT (e.g. NX).

FIG. 3 illustrates schematically a communication system 1 in which different embodiments according to the present teachings may be implemented. For simplicity, LTE terminology is used for describing various embodiments, but it is noted that the teachings may be applied for a variety of wireless communication systems and standards besides LTE, e.g. evolved LTE or a new 5G RAT (NR, New Radio access technology).

A generalization of the dual connectivity feature to a multi-connectivity concept is suggested herein, wherein a communication device 4, in the following exemplified by a user equipment (UE), may exchange both control plane and user plane traffic with one or more available network nodes 2a, 2b over one or more wireless connections. The network nodes 2a, 2b may, for instance, comprise eNBs, but other types of network nodes are also possible, e.g. NR Access Nodes or radio heads implementing only Radio Link control (RLC)/Media Access Control (MAC)/Physical Layer (PHY) or MAC/PHY. Various setups are possible, and FIG. 3 illustrates one such exemplary setup.

Control plane packets from a Radio Resource Control (RRC) protocol may be exchanged between a control plane function 5a in a first network node 2a (the leftmost network node in FIG. 3) and the UE4. In this context, it is noted that at least for LTE, an RRC function is an example of a control plane function and the term control plane is used in the following. The control plane packets (e.g. RRC packets) may be delivered to the UE4 from the first network node 2a itself or via a second network node 2b (the rightmost network node in FIG. 3). The control plane packets may, in fact, be delivered to the UE4 via any network node that the UE4 is connectible to, and that is directly or indirectly (e.g. via an intermediate network node) connected to the first network node 2a. Further, the control plane packets may be delivered over any wireless access technology, for instance, LTE access or 5G NR access as indicated at reference numerals 3a, 3b and 7a, 7b, respectively. This is true irrespective of which of the first and second network node 2a, 2b that delivers the particular control plane packet. The dashed lines indicate these different delivery routes for the control plane packets: from the control plane function 5a of the first network node 2a to the UE 4 via, for instance, LTE access 3a or 5G/NR access 7a, or from the control plane function 5a of the first network node 2a to the UE4 via a wireless radio delivery function 3b, 7b of the second network node 2b.

It is noted that the first and second network nodes 2a, 2b do not both (or all, in case of more than two network nodes being involved in serving the UE) need to have control plane functions and userplane (UP) functions, and these are therefore indicated in the FIG. 3 as optional for the second network node 2b. Further still, there might be more than one control plane function active at a given moment. For example, both the first and the second network nodes 2a, 2b in FIG. 3 may have an independent control plane connection (also denoted RRC connection in case of LTE) with the UE4 or the control plane function 5a of the first network node 2a may, in different ways, be coordinated with the control plane function 5b of the second network node 2b.

The user plane packets sent from one of the user plane functions 6a, 6b may similarly be delivered to the UE4 by any of the network nodes 2a, 2b over any of their supported radio accesses 3a, 7a, 3b, 7b. Such different delivery routes for user plane packets may, for instance, comprise a route from the userplane function 6a of the first network node 2a to the UE4 via, for instance, LTE access 3a or 5G/NR access 7a, or from the userplane function 6a of the first network node 2a to the UE4 via a wireless radio delivery function 3b, 7b of the second network node 2b. This enables the possibility to have multiple connections for user plane data between a radio access network (RAN) and a core network (e.g. over interface S1-U between an eNB and an S-GW) that simultaneously deliver user plane packets to and from the UE4, but where the particular air-interface connection that is used, i.e., which network node actually communicates with the UE in the end, is not necessarily known by the core network (e.g. S-GW thereof).

The identifiers introduced herein may be different in uplink and downlink. The uplink identifier should identify which UE originated the PDCP packet and to which network node the packet should be routed. However, in case the UE sends a PDCP packet directly to the network node to which the packet is destined, the latter is not necessary. If the UE sends the packet to another network node than to which the packet is ultimately destined it includes an identifier of itself, the other network node then forwards the packet towards the ultimate destination network node over, in case of LTE, the X2 interface (the ultimate destination network node may be several hops away). An alternative to including the UE identifier is that the two network nodes use a Stream Control Transmission Protocol (SCTP) trunk or SCTP stream that is dedicated to a particular UE. In this case the network nodes can correlate the identity of the UE with the SCTP trunk or SCTP stream on which the packet is sent and received. An alternative is to associate a specific radio bearer of a specific UE with the SCTP stream or trunk and from this association deduce the UE's identity.

In downlink the UE needs to know which network node protected the packet, assuming there is only one PDCP processing configuration per network node/UE (e.g. eNB/UE) pair as is the case in LTE. If there may be more than one PDCP processing configuration, the downlink identifier needs to identify also which configuration within the network node that should be used for the particular packet.

Network nodes may have to coordinate the generation and assignment of identifiers so that there is no ambiguity to which network node/UE a PDCP packet shall be routed, and so that there is no ambiguity with respect to which configuration to use for the PDCP processing on the receiving end.

The above briefly described points will be described in more detail in the following. In the multi-connectivity scenario described with reference to FIG. 1, the UE4 may have an arbitrary number of connectivity legs to different, at least two, network nodes 2a, 2b.

According to an embodiment, an identifier is transmitted together with the PDCP packet, for instance in the PDCP header. The identifier indicates to the UE4 which PDCP processing context (e.g. ciphering algorithm, security parameters, security state) the packet has been processed with. Since there are multiple (more than one) connectivity legs and multiple (more than one) network nodes 2a, 2b and thus multiple PDCP processing contexts involved, a single bit indicator may not be enough as an identifier. Therefore the identifier may need to be extended to multiple bits. In particular, the identifier should enable the receiver to determine which entity processed the packet at the sender and also which PDCP processing context that the sender used. To this end, the identifier may be a compound identifier. That is, the identifier comprises one identifier for the entity and one another identifier for the PDCP processing context. In downlink, the receiver is the UE4 and the sender is the network node 2a, 2b, and conversely, in uplink, the receiver is the network node 2a, 2b and the sender is the UE4.

The identifier is used for inter-node routing and for intra-node routing. The intra-node routing comprises "routing" the PDCP packet to the correct PDCP processing context within a network node 2a, 2b, or within the UE4 once it is known which network node 2a, 2b processed the packet on the network side. The intra-node routing may also be viewed as looking up the correct PDCP processing context in a conceptual or literal database. The inter-node routing ensures that a PDCP packet reaches the correct network node 2a, 2b in the network or that the UE4 can determine which network node 2a, 2b processed the packet. Inter-node routing of downlink PDCP packets is described first, followed by inter-node routing of uplink PDCP packets.

Downlink Transmission

In inter-node routing of downlink PDCP packets the first network node 2a creates a control plane message or decides to forward a user plane packet to the UE4. The first network node 2a then identifies an appropriate PDCP processing context. If the first network node 2a only shares one PDCP processing context with the UE4, then that context is selected. The first network node 2a may however share several PDCP processing contexts with the UE4, where each one is used for a specific purpose (e.g. for different types of services). A specific example where this may be useful is a case wherein the UE4 is attached to two different network slices, e.g., one network slice for corporate access and one network slice for general internet access. A "network slice" may comprise virtualized network elements and/or physical resources. For instance, a network slice may comprise a virtualized MME (also denoted MME instance) and a network node. In case of using e.g. different network slices, the first network node 2a may need to use e.g. different security parameters for packets belonging to the respective network slice. After having identified the network slice specific processing context, the first network node 2a encapsulates the control plane packet or user plane packet in a PDCP packet in accordance with the identified PDCP processing context (e.g. using the identified security parameters). In addition, the first network node 2a associates an identifier for the PDCP processing context and an identifier for itself (i.e. an identifier identifying the first network node 2a) with the packet and attaches the identifier to the PDCP packet.

The identifier to be attached to the PDCP packet may be implemented in different ways. For instance, the identifier for the PDCP processing context and the identifier for the network node may be included in the PDCP header. In other embodiments, the identifier for the PDCP processing context and the identifier for the network node may be transported together with the PDCP header, e.g. transported in a lower layer protocol. In still other embodiments, the identifier for the PDCP processing context and the identifier for the network node may be a single identifier, i.e. one and the same for both the PDCP processing context and the network node. This requires that the identifier is unique among all network nodes that the UE is connected to (coordination of identifiers between network nodes is described more in detail later), or that a structure is imposed on the identifier so that it is possible to determine by the structure which network node processed the packet and which PDCP processing context was used. This can for example be accomplished by allowing the N most significant bits to represent the network node and the rest of the bits to represent the PDCP processing context within that network node. More generally, a respective certain range of all the identifiers may be pre-allocated to each network node, either via Operations and Maintenance (OAM) or via control protocols such as e.g., X2 Application Protocol (AP) between the network nodes and RRC protocol between the network node and the UE.

Once the PDCP packet has been created in the network node, it can be delivered using various routes, as described earlier e.g. with reference to FIG. 1. The created PDCP packet (comprising the identifier of the PDCP processing context) may be delivered to the UE directly from the network node via a data radio bearer or signaling radio bearer that they share. Alternatively, the network node may forward the PDCP packet to another delivery function, possibly in another network node. In that case an identifier for the UE should be transmitted together with the PDCP packet. The other delivery function may in turn forward the PDCP packet to yet another delivery function, or it may deliver the packet to the UE. The network nodes must hence agree on the UE identifier so that they know that it corresponds to the same UE.

In an aspect, a network node receiving a PDCP packet destined for a UE may decide, based on a condition of the PDCP packet, whether to forward the PDCP packet to another network node or to transmit the packet to the UE. An example of such condition is the number of network nodes (e.g. number of eNBs) that previously have forwarded the PDCP packet. In such case a "number of hops" value may be used. A network node receiving the PDCP packet may increase the "number of hops" value by one and transmit it together with the PDCP packet when it is forwarded from one network node to another. Another example of such condition on whether to forward the PDCP packet to another network node or to transmit it to the UE is the current load on a radio bearer that the network node shares with the UE.

When the UE receives the PDCP packet, it cannot assume that the packet was protected by the network node that delivered it over the air-interface, as has been described. Hence, in order to determine which PDCP processing context to use when processing the packet, the UE determines from the identifier received together with the PDCP packet which network node and which particular PDCP processing context within that network node was used, and then process the PDCP packet accordingly.

Uplink Transmission

In the uplink, the UE may decide to which network node to send a certain packet and which PDCP processing context within in that network node to use for the packet. The determination corresponds to the determination that the network node does when choosing a PDCP processing context for downlink packets. Once this is chosen, the UE processes the packet and transmits it to one of the network nodes, together with the identifier for the PDCP processing context. The packet may not be transmitted to the same network node that is the ultimate target for the packet, e.g. because the air-interface channel to that network node is heavily loaded at the moment. Another reason for the ultimate target network node not being the first receiving network node could be that it is a retransmission where the retransmission is not sent over the same leg as the first attempt. If the UE sends the packet to a different network node than the ultimately targeted one, the UE also includes its identifier together with the PDCP packet.

Once a network node has received a PDCP packet from a UE, it first determines whether it is the ultimate receiver for the PDCP packet. This determination is made based on the included PDCP processing context identifier. If the network node is not the ultimate receiver, the network node forwards the PDCP packet towards the ultimate receiver. Such forwarding can be based on routing tables that are statically or dynamically configured in the network nodes. The network nodes may need to know whether a PDCP packet should be forwarded to another network node or to a UE. This may be accomplished in different ways. For instance, the UE or the network node that first receives the PDCP packet may tag the packet as being an uplink packet. An advantage of letting the network node perform such tagging is that an increased security is provided. If the UE performs the tagging, it could set the tag incorrectly, which could potentially be used for malicious actions by the UE. As another example, the PDCP processing context identifier space is portioned such that the identifier reveals whether it is an uplink or downlink packet. However, this way of informing whether the PDCP packet should be forwarded to another network node or to a UE is less secure, just as when letting the UE tag uplink packets as such.

As indicated earlier, coordination of identifier assignment may be required to ensure that the identifiers assigned to different PDCP processing contexts are unique in their respective domain. There are several alternatives for how to realize such coordination.

One option is to have a centralized network node-controlled coordination. In this coordination method one of the network nodes in a set of network nodes providing the multi-connectivity to a UE has a coordination role, handing out the PDCP processing context identifiers to the other network nodes. This may be a network node having a "master role" (e.g. Master eNB, MeNB, role in case of LTE), but it may also be a network node which has no other coordination responsibilities than that of the PDCP processing context identifier. In the latter case, the network node may have received this responsibility by virtue of being the network node to which the first connectivity leg was established among the currently established connectivity legs. If the coordinating network node is also responsible for additions and removals of connectivity legs (relating to the UE) to other network nodes, then the coordination is straightforward to implement: when the coordinating network node adds a connectivity leg (relating to the UE) to a new network node, the coordinating network node allocates a new identifier to the new network node. If embodiments in which forwarding packets processed with another PDCP processing context is used, then the forwarding could occur only between pairs of network nodes where the coordinating network node is one of the network nodes in the pair or the coordinating network node has to inform all other network nodes involved in the same multi-connectivity setup of all new PDCP processing context identifiers and the network nodes owning the PDCP processing contexts they are associated with. If any of the network nodes in the set can add a new connectivity leg (relating to the UE) to a new network node, then, when this happens, one of the two involved network nodes has to request a new PDCP processing context identifier from the coordinating network node.

Another option is to have coordination in a centralized control node. With this coordination method a network node in a controller role, such as a cluster head, a Radio Network Controller (RNC)-like node or another controlling entity is in control of the assignment of PDCP processing context identifiers. The controlling entity may be responsible for the management of the entire multi-connectivity, e.g. in terms of adding and removing connectivity legs, but it may also be the case that it is only responsible for assignment of PDCP processing context identifiers. In the former case, the controlling entity essentially acts as the coordinating network node in the above description of the centralized network node controlled coordination method (except for the optional forwarding). In the latter case, network nodes in the multi-connectivity set would instead request new identifier values of the PDCP processing context from the controlling entity.

Still another option is to have a distributed network node-controlled coordination. With this coordination method any of the network nodes can add a connectivity leg (relating to the UE) to another network node and either assign a new PDCP processing context identifier to it or let it assign its own value. In either case, this new PDCP processing context identifier has to be distributed to the other network nodes in the multi-connectivity set, both to inform the other network nodes (about the occupied identifier, if the above described optional forwarding between network nodes is used, also about which network node the identifier belongs to) and to let them object if a collision is discovered. Such collisions may occur during race conditions where multiple additions of connectivity legs occur simultaneously in the multi-connectivity set. In such cases, backoff strategies have to be employed, such as both colliding parties choose new values, or one of the colliding parties gets to keep the colliding identifier (e.g. based on a node identifier e.g. the lowest node identifier can keep the identifier, where the node identifiers are ordered from lowest to highest according to some criterion) or a negotiation procedure has to take place.

As a last example, a UE-controlled coordination may be used. This coordination method leverages that the UE from having to be aware of all connectivity legs and all PDCP processing context identifiers. Hence, instead of informing the UE of a new PDCP processing context identifier, the network requests the UE to assign a new identifier. An alternative may comprise the network assigning the PDCP processing context identifier, e.g. self-assignment by each network node, but requests the UE to verify the uniqueness thereof before the new identifier is used.

Figure 4:
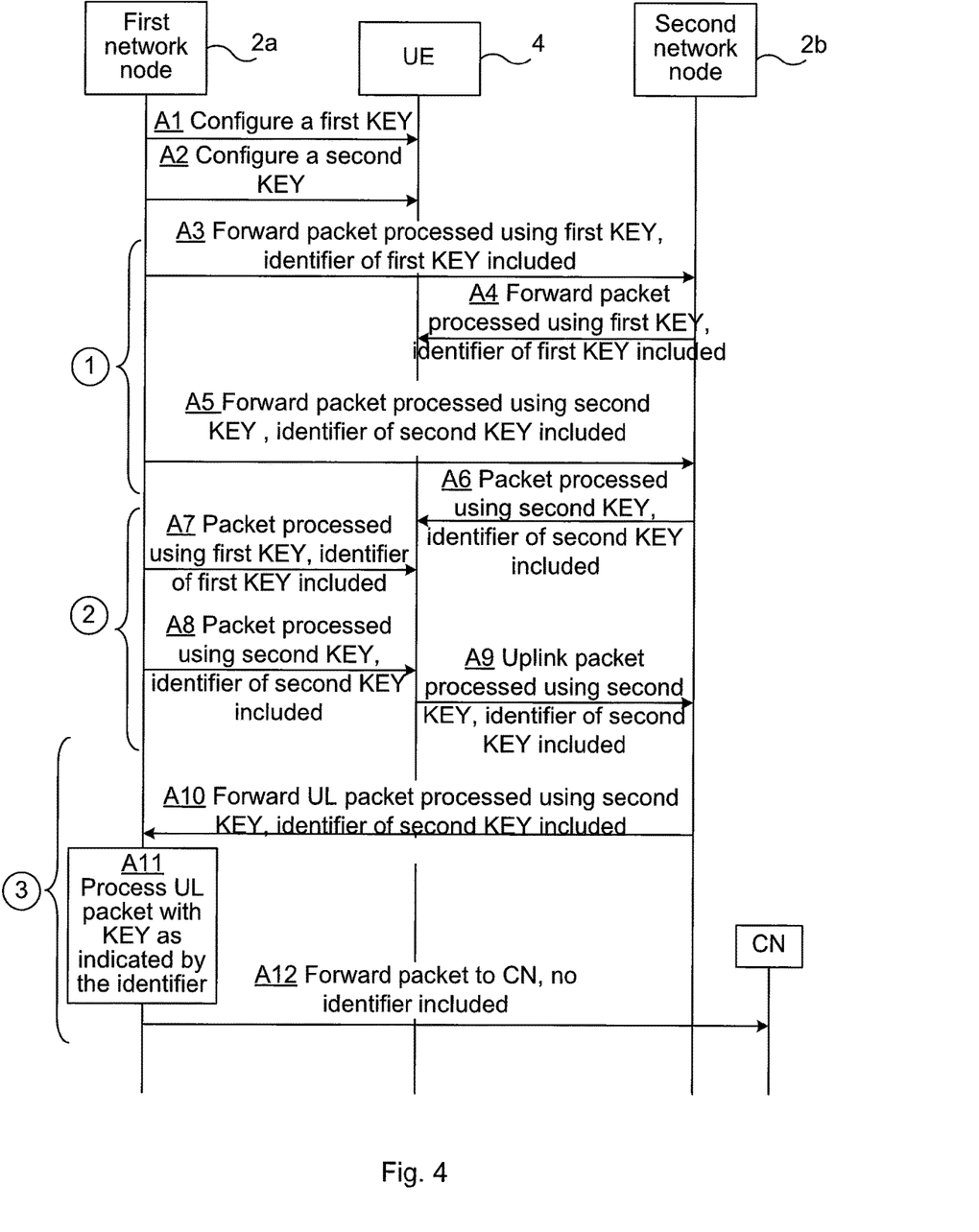
FIG. 4 is a signaling diagram of embodiments in accordance with the present teachings.

FIG. 4 is a signaling diagram of embodiments in accordance with the present teachings. In the example of FIG. 4, only a security key KEY is considered which may, for instance, correspond to a KeNB in LTE. However, it should be clear that the teachings apply to any data protocol processing contexts, in particular any access stratum (AS) security context data and any configuration data related to RRC and protocols such as PDCP.

At arrow A1, a first network node 2a configures a first KEY for a UE4. This first KEY may relate to a first connectivity leg providing a first service, e.g. a corporate access, between the UE and the first network node 2a. At arrow A2, the first network node 2a configures a second KEY for the UE4. This second KEY may relate to a second connectivity leg providing a second service, e.g. a general internet access, between the UE and the first network node 2a.

At arrow A3, the first network node 2a forwards a packet processed using the first KEY to a second network node 2b. The first network node 2a includes an identifier of the first KEY in the forwarded packet. The identifier is an identifier as has been described herein, and enables the UE4 to correlate the identifier to a given processing context, which in turn makes it possible for the communication device 4 to have several connections simultaneously to one or more network nodes. Instead of sending the packet directly to the UE4 the first network node 2a, may for different reasons, send it through the second network node 2b.

At arrow A4, the second network node 2b forwards the received packet to the UE4, including the identifier of the first KEY. The second network node 2b may have a connectivity leg to the UE4 using any wireless connectivity technology (e.g. LTE, 5G/NR etc.).

At arrows A5, A6 the above two steps are repeated for a second KEY:

At arrow A5, the first network node 2a forwards a packet processed using the second KEY to the second network node 2b. The first network node 2a includes an identifier of the second KEY in the forwarded packet.

At arrow A6, the second network node 2b forwards the received packet to the UE4, including the identifier of the second KEY. The second network node 2b may have a connectivity leg to the UE4 using any wireless access technology (e.g. LTE, 5G/NX etc.). In particular, the second connectivity leg (between second network node 2b and the UE) need not use the same wireless access technology as the first connectivity leg (between second network node 2b and the UE).

Encircled numeral 1 indicates downlink and how the processing function is performed in the first network node 2a, while the delivery function to the UE4 is performed by the second network node 2b.

At arrow A7, the first network node 2a sends a packet processed using the first KEY to the UE4, including the first KEY in or with the packet.

At arrow A8, the first network node 2a sends a packet processed using the second KEY to the UE4, including the second KEY in or with the packet.

Encircled numeral 2 indicates that the downlink processing function and the delivery function to the UE4 is performed in the first network node 2a. By means of the identifier, the UE4 can have multiple connections to the first network node 2a even though they use different processing context parameters (exemplified by KEY in this case).

At arrow A10, the second network node 2b has received a packet from the UE4 (i.e. an uplink packet), and forwards it to the first network node 2a, which has the processing function for the UE4.

At arrow A11, the first network node 2a processes the uplink packet with the KEY as indicated by the identifier included in or with the packet. The KEY may thus be the first KEY or the second KEY, which the first network node 2a is in position to find out since the identifier is provided.

At arrow A12, when the first network node 2a has processed the packet, it may forward it to the core network. In this case the identifier does not have to be included.

Encircled numeral 3 indicates uplink and how the processing function is performed in the first network node 2a, while the delivery/reception function to/from the UE4 is performed by the second network node. User plane packets may be delivered to a serving gateway (S-GW) in a core network, as is also indicated.

It is noted that the described multi-connectivity solution, in its various embodiments, may, for instance, be applied to an extension of the LTE dual connectivity scenario, carrier aggregation scenarios as well as scenarios where different connectivity legs utilize different radio access technologies (RATs), e.g. LTE and NR.

In some embodiments, the methods, in their various embodiments, may be selectively applied. That is, the methods may not need to be applied at all times. This may be useful e.g. when bandwidth is very scarce and there is little room for the added PDCP processing context identifier according to the present teachings.

In summary, the disclosed methods and network nodes brings about several advantages. An advantage of the multi-connectivity bearer handling, enabled by the present teachings, and how processing context can be identified regardless of which network node delivered a packet and which network node created the PDCP packet is that "handovers" can be completely transparent to the UE. From the UE perspective, handovers do not even occur, as the UE simply receives packets from different network nodes continuously and does not need to keep track of which is the serving network node. The latter assumes, in some instances, that if the control plane function is transferred from a source network node (e.g. source eNB) to a target network node (e.g. target eNB), the identifier associated with the source network node needs to be associated with the target network node after the handover. If this were not to be the case, an uplink PDCP packet from the UE that includes an identifier for the ultimate target network node would get misrouted. The seamless mobility properties result in that continuous data transmission/reception behavior can be supported also in cases when, in LTE, a handover would be required. The method thereby removes the packet loss and transmission delay during the KEY reconfiguration period present at handovers in LTE. This gives the user of the UE an improved experienced performance.

The various embodiments and features that have been described may be combined in many different ways, examples of which are given in the following.

Figure 5:
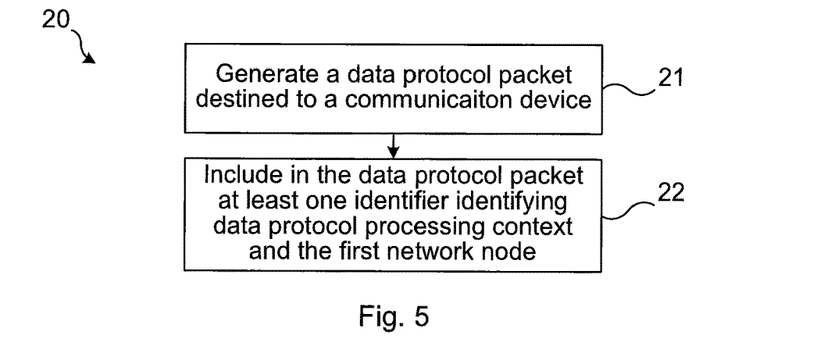
FIG. 5 illustrates a flow chart over steps of an embodiment of a method in a network node in accordance with the present teachings.

FIG. 5 illustrates a flow chart over steps of an embodiment of a method in a network node in accordance with the present teachings. The method 20 of multi-connectivity handling in a communication system 1 may be performed in a first network node 2a, which may comprise a node of a packet-switched communication network. The first network node 2a may, for instance, comprise a radio access node such as an eNB. In other embodiments, the method 20 may be implemented in a core network node.

The method 20 comprises generating 21 a data protocol packet destined to a communication device 4.

The method 20 comprises including 22 in the data protocol packet at least one identifier identifying data protocol processing context and the first network node 2a. In some embodiments, a single identifier is used for identifying both the data protocol processing context and the first network node 2a. In other embodiments, two identifiers are used: one for identifying the data protocol processing context and another for identifying the first network node 2a. That is, one or more identifiers may be used for identifying the data protocol processing context and the first network node 2a.

The generating of a data protocol packet may, for instance, comprise including control information such as destination address and user data (i.e. payload) in the data protocol packet. Such destination address may, for instance, correspond to a phone number of the communication device 4 when the communication device is e.g. a smart phone. It is noted that the first network node 2a may determine and include an absolute final destination (i.e. the communication device 4) or a next-hop network node to which the data protocol packet is to be sent. Further, at least one identifier identifying a data protocol processing context and the first network node 2a is included in the data protocol packet. The inclusion of the identifier identifying the data protocol processing context and the source node (i.e. the first network node 2a), overcomes the difficulty of the communication device 4 not knowing from the logical channel identifier which data protocol processing context (e.g. which configuration information and which state information) to use when receiving the generated data protocol packet. Such difficulty may, as has been described, occur when multi-connectivity features are introduced and used.

The method 20 provides several advantages. For instance, the method 20 enables the separation of data protocol entities from their delivery mechanism, e.g. from RLC/MAC/PHY in LTE. This in turn enables the communication device 4 to connect to multiple network nodes (e.g. eNBs) on the RLC/MAC/PHY level, but connect on the PDCP/RRC level to other network nodes. By the identification of the data protocol processing context and of the sender, the communication device 4 is able to correlate the identifier to a given processing context, which in turn makes it possible for the communication device 4 to have several connections simultaneously to one or more network nodes.

In an embodiment, the method 20 comprises including the at least one identifier in a header of the data protocol packet. As has been described earlier, the at least one identifier identifying the data protocol processing context and the data packet originator may be implemented in different ways. For instance, the N most significant bits of the identifier may represent the data packet originator (sender) and the remaining bits may represent the data protocol processing context, or the identifier may be selected among a range of pre-allocated identifiers. Further details on these examples has been given earlier, and still further examples on how to implement the identifier has also been described earlier.

In various embodiments, the method 20 comprises including in the data protocol packet an identifier of the communication device 4 and forwarding the data protocol packet to a second network node 2b for deliverance to the communication device 4. As has been described, there are several options regarding routes for a packet between the node creating the packet and the node to which the packet is destined, one option is through a second network node 2b.

In various embodiments, the method 20 comprises sending the data protocol packet to the communication device 4. In case of sending the data protocol packet directly to the communication device 4, 8.

In various embodiments, the method 20 comprises receiving, from the communication device 4 a data protocol packet comprising at least one identifier identifying a data protocol processing context of the data protocol packet and the first or a second network node 2a, 2b or a second communication device 8 as being destination node. The method 20 is performed in a first network node 2a transmitting a generated data protocol packet to the communication device, but this method 20 may be combined with a method 50 (described e.g. with reference to FIG. 6) for receiving data protocol packets created e.g. in a communication device 4, as these embodiments suggest.

In a variation of the above embodiment, the method 20 comprises determining that the data protocol packet is destined to the second network node 2b or the second communication device 8, and comprises indicating the data protocol packet as an uplink packet or as a downlink data protocol packet, respectively, and forwarding the data protocol packet according to the determination. The indicating can be performed in different manners, as have been described, e.g. by tagging the packet as uplink or downlink packet, or by imposing a structure on the processing context identifier space, wherein the structure reveals whether it is an uplink or downlink packet.

In another variation, the method 20 comprises determining that the data protocol packet is destined to the first network node 2a and using the data protocol processing context corresponding to the received at least one identifier. That is, the first network node 2a identifies that the data protocol packet is destined to itself, and processes the packet according to the received identifier, i.e. using the identified data protocol processing context.

In various embodiments, the data protocol comprises Packet Data Convergence Protocol, PDCP. In other embodiments, the data protocol may comprise a Sub Network Dependent Convergence Protocol or a Link Layer Control protocol.

It is noted that the method 20, in its various embodiments and described e.g. with reference to FIG. 5, and the method 50, in its various embodiments, described next with reference to FIG. 6, may both be implemented in a single node.

Figure 6:
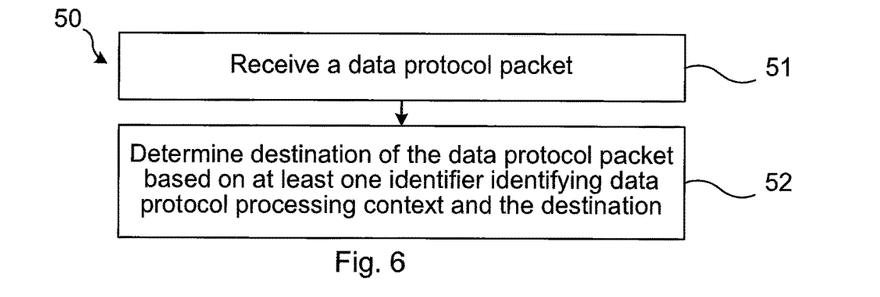
FIG. 6 illustrates a flow chart over steps of an embodiment of a method in a network node in accordance with the present teachings.

FIG. 6 illustrates a flow chart over steps of an embodiment of a method in a network node in accordance with the present teachings. The method 50 of multi-connectivity handling in a communication system may be performed in a second network node 2b, which may comprise a node of a packet-switched communication network. The second network node 2b may, for instance, comprise a radio access node such as an eNB. In other embodiments, the method 50 may be implemented in a core network node.

The method 50 comprises receiving 51 a data protocol packet.

The method 50 comprises determining 52 destination of the data protocol packet based on at least one identifier in the data protocol packet, the at least one identifier identifying data protocol processing context and the destination.

In an embodiment, the method 50 comprises determining that the data protocol packet is destined to a network node 2a or a communication device 4, 8, and comprising indicating the data protocol packet as an uplink packet or as a downlink data protocol packet, respectively, and forwarding the data protocol packet according to the determination.

In various embodiments, the method 50 comprises the receiving 51, from the communication device 4 a data protocol packet, comprises receiving at least one identifier identifying a data protocol processing context of the data protocol packet and a first or the second network node 2a, 2b or a second communication device 8 as being destination node.

In an embodiment, the method 50 comprises the data protocol comprises Packet Data Convergence Protocol, PDCP.

Figure 7:
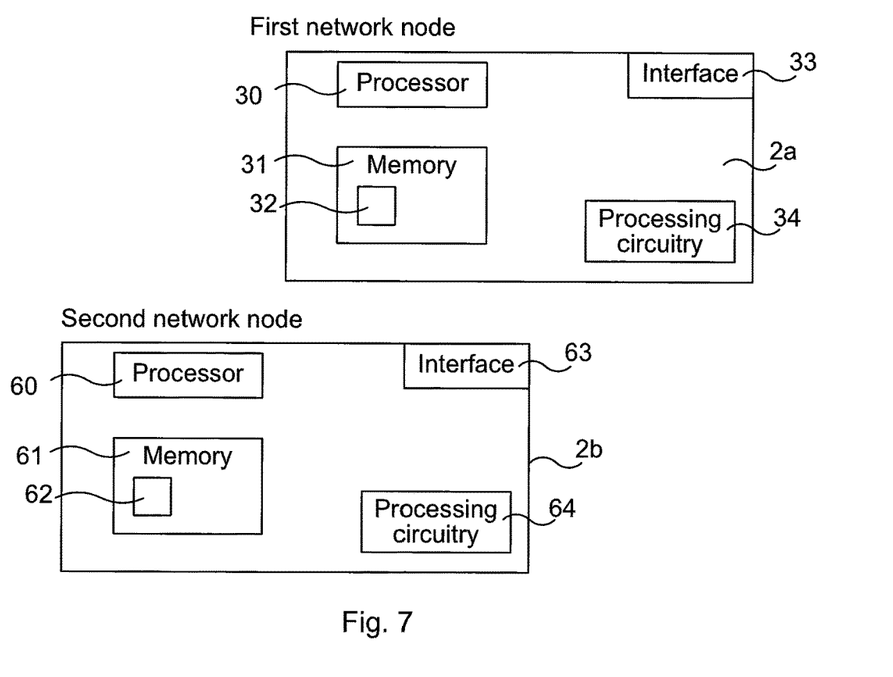
FIG. 7 illustrates schematically network nodes and means for implementing embodiments in accordance with the present teachings.

FIG. 7 illustrates schematically network nodes and means for implementing embodiments in accordance with the present teachings. In FIG. 7 two network nodes 2a, 2b are shown (also indicated as first network node and second network node, respectively), in which one or both methods 20, 50 that have been described in various embodiments can be implemented. Each of the first and second network node 2a, 2b comprises a processor 30, 60 comprising any combination of one or more of a central processing unit (CPU), multiprocessor, microcontroller, digital signal processor (DSP), application specific integrated circuit etc. capable of executing software instructions stored in a respective memory 31, 61 which can thus be a computer program product 31, 61. The processor 30 of the first network node 2a can be configured to execute any of the various embodiments of the method 20 for instance as described in relation to FIG. 5. The processor 60 of the second network node 2b can be configured to execute any of the various embodiments of the method 50 for instance as described in relation to FIG. 6. It is again noted that both methods 20, 50 may be implemented in a single network node 2a, 2b, as each network node 2a, 2b may typically act as a transmitting node as well as a receiving node.

The memory 31, 61 can be any combination of read and write memory (RAM) and read only memory (ROM), Flash memory, magnetic tape, Compact Disc (CD)-ROM, digital versatile disc (DVD), Blu-ray disc etc. The memory 31, 61 may also comprise persistent storage, which, for example, can be any single one or combination of magnetic memory, optical memory, solid state memory or even remotely mounted memory.

Each of the first and second network nodes 2a, 2b comprises an interface 33, 63 for communication with other devices. The interface 33, 63 may, for instance, comprise an interface e.g. protocol stacks etc., for communication with other network nodes, and also an interface for communication with wireless devices 4, 8.

Each of the first and second network nodes 2a, 2b may comprise additional processing circuitry, schematically indicated at reference numerals 34, 64, respectively, for implementing the various embodiments according to the present teachings.

A first network node 2a is provided for multi-connectivity handling in a communication system 1. The first network node 2a is configured to:
  generate a data protocol packet destined to a communication device 4, and
  include in the data protocol packet at least one identifier identifying data protocol processing context and the first network node 2a.

The first network node 2a may be configured to perform the steps of the method 20 described e.g. with reference to FIG. 5 e.g. by comprising one or more processors 30 and memory 31, the memory 31 containing instructions executable by the processor 30, whereby the first network node 2a is operative to perform the steps. In an embodiment thus, the first network node 2a for multi-connectivity handling in a communication system 1 comprises one or more processors 30 and memory 31, the memory 31 containing instructions executable by the processor 30, whereby the first network node 2a is operative to generate a data protocol packet destined to a communication device 4, and to include in the data protocol packet at least one identifier identifying data protocol processing context and the first network node 2a.

It is again noted that the first network node 2a may also be configured to perform also the steps of the method 50 described e.g. with reference to FIG. 6.

In an embodiment, the first network node 2a is configured to include the at least one identifier in a header of the data protocol packet.

In various embodiments, the first network node 2a is configured to include in the data protocol packet an identifier of the communication device 4 and to forward the data protocol packet to a second network node 2b for deliverance to the communication device 4.

In various embodiments, the first network node 2a is configured to send the data protocol packet to the communication device 4.

In various embodiments, the first network node 2a is configured to receive, from the communication device 4 a data protocol packet comprising at least one identifier identifying a data protocol processing context of the data protocol packet and the first or a second network node 2a, 2b or a second communication device 8 as being destination node.

In various embodiments, the first network node 2a is configured to determine that the data protocol packet is destined to a second network node 2b or a second communication device 8, and to indicate the data protocol packet as an uplink packet or as a downlink data protocol packet, respectively, and to forward the data protocol packet according to the determination.

In various embodiments, the first network node 2a is configured to determine that the data protocol packet is destined to the first network node 2a and to use the data protocol processing context corresponding to the received at least one identifier.

In various embodiments, the first network node 2a is configured to wherein the data protocol comprises Packet Data Convergence Protocol, PDCP.

A second network node 2b is provided for multi-connectivity handling in a communication system 1. The second network node 2b is configured to:
  receive a data protocol packet, and
  determine destination of the data protocol packet based on at least one identifier in the data protocol packet, the at least one identifier identifying data protocol processing context and the destination.

The second network node 2b may be configured to perform the steps of the method 50 described e.g. with reference to FIG. 6 e.g. by comprising one or more processors 60 and memory 61, the memory 61 containing instructions executable by the processor 60, whereby the second network node 2b is operative to perform the steps. In an embodiment thus, the second network node 2b for multi-connectivity handling in a communication system 1 comprises one or more processors 60 and memory 61, the memory 61 containing instructions executable by the processor 60, whereby the second network node 2b is operative to receive a data protocol packet, and to determine destination of the data protocol packet based on at least one identifier in the data protocol packet, the at least one identifier identifying data protocol processing context and the destination.

In an embodiment, the second network node 2b is configured to determine that the data protocol packet is destined to a network node 2a or a communication device 4, 8, and to indicate the data protocol packet as an uplink packet or as a downlink data protocol packet, respectively, and to forward the data protocol packet according to the determination.

In various embodiments, the second network node 2b is configured to receive, from the communication device 4 a data protocol packet, comprising at least one identifier identifying a data protocol processing context of the data protocol packet and the first or a second network node 2a, 2b or a second communication device 8 as being destination node.

In various embodiments, the data protocol comprises a Packet Data Convergence Protocol, PDCP.

The present teachings also encompass a computer program 32 for a first network node 2a for multi-connectivity handling in a communication system. The computer program 32 comprises computer program code, which, when executed on at least one processor on the first network node 2a causes the first network node 2a to perform the method 20 according to any of the described embodiments. The present teachings also encompass a computer program 62 for a second network node 2b for multi-connectivity handling in a communication system. The computer program 62 comprises computer program code, which, when executed on at least one processor on the second network node 2b causes the second network node 2b to perform the method 50 according to any of the described embodiments.

The present teachings also encompasses computer program products 31, 61 comprising computer programs 32, 62 for implementing the embodiments of the methods 20, 50 as described, and a computer readable means on which the computer programs 32, 62 are stored. The computer program products, or the memory, thus comprises instructions executable by the processor 30, 60. Such instructions may be comprised in a computer program, or in one or more software modules or function modules. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 8:
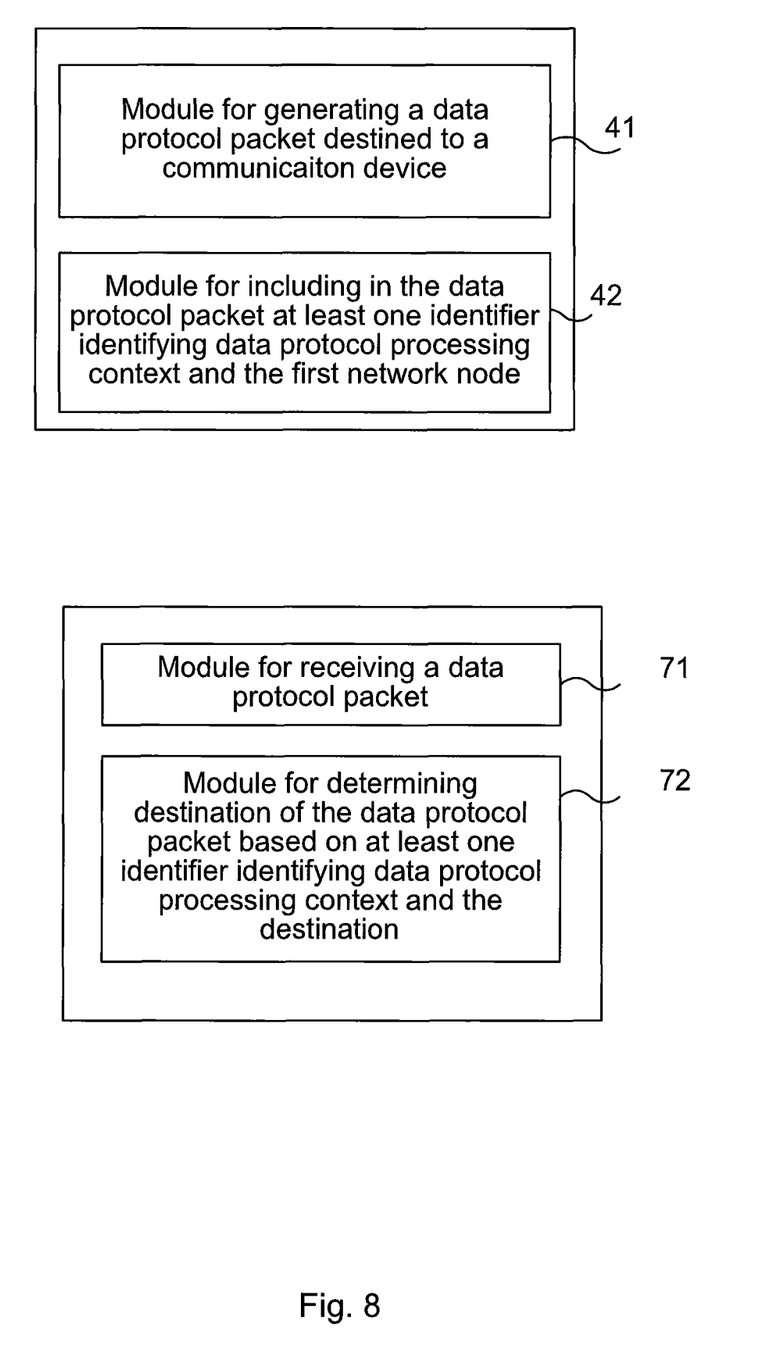
FIG. 8 illustrates network nodes comprising function modules/software modules for implementing embodiments of the present teachings.

FIG. 8 illustrates network nodes comprising function modules/software modules for implementing embodiments according to the present teachings. The modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the methods 20, 50 that have been described.

A first network node is provided for multi-connectivity handling in a communication system. The first network node comprises a first module 41 for generating a data protocol packet destined to a communication device. Such first module 41 may, for instance, comprise processing circuitry adapted to generate data protocol packets.

The first network node comprises a second module 42 for including in the data protocol packet at least one identifier identifying data protocol processing context and the first network node. Such second module 42 may, for instance, comprise processing circuitry adapted to include at least one identifier to data protocol packets.

It is noted that one or both of the modules 41, 42 may be replaced by units.

A second network node is provided is provided for multi-connectivity handling in a communication system. The second network node comprises a first module 71 for receiving a data protocol packet. Such first module 71 may, for instance, comprise receiving circuitry adapted for reception and processing of the data protocol packet.

The second network node comprises a second module 72 for determining destination of the data protocol packet based on at least one identifier in the data protocol packet, the at least one identifier identifying data protocol processing context and the destination. Such second module 72 may, for instance, comprise processing circuitry adapted to determine destination of data protocol packets.

It is noted that both illustrated network nodes may comprise all modules or units. For instance a single network node may comprise modules 41, 42 as well as modules 71, 72.

Figure 9:
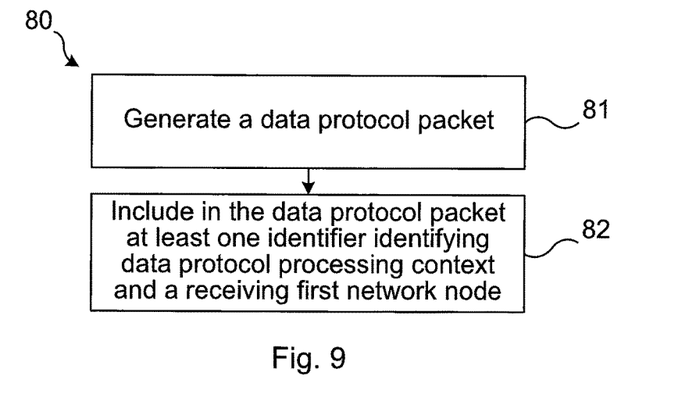
FIG. 9 illustrates a flow chart over steps of an embodiment of a method in a communication device in accordance with the present teachings.

FIG. 9 illustrates a flow chart over steps of an embodiment of a method in a communication device in accordance with the present teachings. The method 80 of multi-connectivity handling in a communication system 1 may be performed in a communication device 4, which may comprise a wireless device, a smart phone, a laptop, a tablet computer etc.

The method 80 comprises generating 81 a data protocol packet.

The method 80 comprises including 82 in the data protocol packet at least one identifier identifying data protocol processing context and a receiving first network node 2a.

In an embodiment, the method 80 comprises sending the data protocol packet to the receiving first network node 2a, and indicating a second network node 2b or a second communication device 8 by including an identifier of the communication device 4. The second network node 2b is thus different than the receiving first network node 2a. As has been described, in multi-connectivity scenarios there are various routes that a data protocol packet may be sent along. It is not always the case that a network node, e.g. a radio access node, that first receives a packet, is the only network node receiving packets of a particular data protocol flow. In contrast, in such multi-connectivity scenarios the data protocol packets of a flow may be delivered over different Data Radio Bearers to two or more network nodes, and also routed through several network nodes.

In various embodiments, the method 80 comprises determining that the data protocol packet is destined to a network node 2a, 2b or a second communication device 8, and comprising indicating the PDCP packet according to the determination.

In various embodiments, the data protocol comprises Packet Data Convergence Protocol, PDCP.

Figure 10:
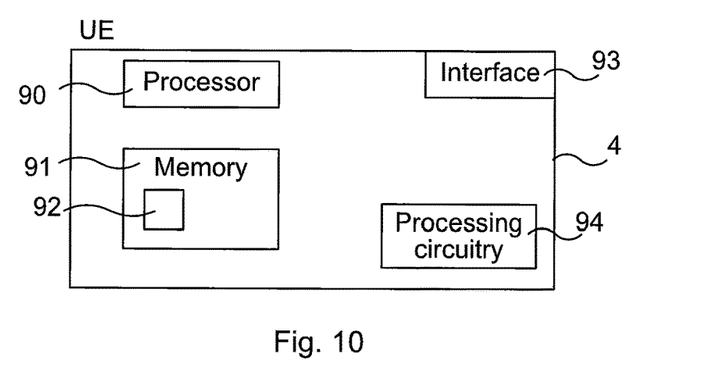
FIG. 10 illustrates schematically a communication device and means for implementing embodiments of the method in accordance with the present teachings.

FIG. 10 illustrates schematically a communication device 4 and means for implementing embodiments of the method in accordance with the present teachings. In FIG. 10 a communication device 4 is shown (also indicated UE), in which the method 80 that has been described in various embodiments can be implemented. The communication device 4 comprises a processor 90 comprising any combination of one or more of a central processing unit (CPU), multiprocessor, microcontroller, digital signal processor (DSP), application specific integrated circuit etc. capable of executing software instructions stored in a memory 91 which can thus be a computer program product 91. The processor 90 of the communication device 4 can be configured to execute any of the various embodiments of the method 80 for instance as described in relation to FIG. 9.

The memory 91 can be any combination of read and write memory (RAM) and read only memory (ROM), Flash memory, magnetic tape, Compact Disc (CD)-ROM, digital versatile disc (DVD), Blu-ray disc etc. The memory 91 may also comprise persistent storage, which, for example, can be any single one or combination of magnetic memory, optical memory, solid state memory or even remotely mounted memory.

The communication device 4 comprises an interface 93 for communication with other devices. The interface 93 may, for instance, comprise an interface e.g. protocol stacks etc., for wireless communication with network nodes, such as radio access nodes.

The communication device 4 may comprise additional processing circuitry, schematically indicated at reference numeral 94, for implementing the various embodiments according to the present teachings.

A communication device 4 is provided for multi-connectivity handling in a communication system 1. The communication device 4 is configured to:
  generate a data protocol packet, and
  include in the data protocol packet at least one identifier identifying data protocol processing context and a receiving first network node 2a.

The communication device 4 may be configured to perform the steps of the method 80 described e.g. with reference to FIG. 9 e.g. by comprising one or more processors 90 and memory 91, the memory 91 containing instructions executable by the processor 90, whereby the communication device 4 is operative to perform the steps. In an embodiment thus, the communication device 4 for multi-connectivity handling in a communication system 1 comprises one or more processors 90 and memory 91, the memory 91 containing instructions executable by the processor 90, whereby the communication device 4 is operative to generate a data protocol packet, and include in the data protocol packet at least one identifier identifying data protocol processing context and a receiving first network node 2a.

In an embodiment, the communication device 4 is configured to send the data protocol packet to the receiving first network node 2a, and to indicate a second node 2b, 8 different than the receiving first network node 2a, as a destination node by including an identifier of the communication device 4.

In various embodiments, the communication device 4 is configured to determine that the data protocol packet is destined to a network node 2a, 2b or a second communication device 8, and to indicate the PDCP packet according to the determination.

In various embodiments, the data protocol comprises Packet Data Convergence Protocol, PDCP.

The present teachings also encompass a computer program 92 for a communication device 4 for multi-connectivity handling in a communication system 1. The computer program 92 comprises computer program code, which, when executed on at least one processor on the communication device 4 causes the communication device 4 to perform the method 90 according to any of the described embodiments.

The present teachings also encompasses a computer program product 91 comprising a computer program 92 for implementing the embodiments of the method as described, and a computer readable means on which the computer program 92 is stored. The computer program product, or the memory, thus comprises instructions executable by the processor 90. Such instructions may be comprised in a computer program, or in one or more software modules or function modules. The computer program product 91 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 11:
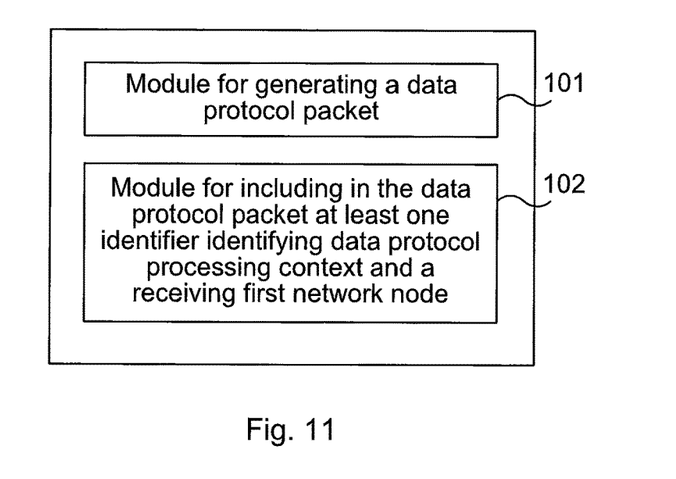
FIG. 11 illustrates a communication device comprising function modules/software modules for implementing embodiments of the present teachings.

FIG. 11 illustrates a communication device comprising function modules/software modules for implementing embodiments of the present teachings. The modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 90 that has been described.

A communication device is provided for multi-connectivity handling in a communication system. The communication device comprises a first module 101 for generating a data protocol packet. Such first module 101 may comprise processing circuitry adapted for generating a data protocol packet.

The communication device comprises a second module 102 for including in the data protocol packet at least one identifier identifying data protocol processing context and a receiving first network node. Such second module 102 may comprise processing circuitry adapted for identifying data protocol processing context and a receiving first network node.

It is noted that one or both of the modules 101, 102 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of multi-connectivity handling in a communication system, the method being performed in a first network node device operating in the communication system, the method comprising:
  receiving, from a first communication device operating in the communication system, a data protocol packet comprising a first identifier identifying a first data protocol processing context of the data protocol packet and a second identifier identifying a second communication device as destination node for the data protocol packet;

determining that the data protocol packet is destined to the second communication device based on the second identifier;

modifying the data protocol packet to comprise an indicator that indicates the data protocol packet as one of an uplink data protocol packet or as a downlink data protocol packet; and forwarding the modified data protocol packet to the second communication device.

2. The method as claimed in claim 1, wherein the first communication device comprises a first user communication device and the second communication device comprises a second network node device.

3. The method as claimed in claim 2, the method further comprising:

generating a second data protocol packet destined to the first user communication device, and including in the second data protocol packet a third identifier identifying a second data protocol processing context, fourth identifier identifying the first network node as the originating node, and a fifth identifier identifying the first user communication device as the destination node for the second data protocol packet; and forwarding the second data protocol packet to the second network node device to deliver to the first user communication device.

4. The method as claimed in claim 3, the method further comprising:

determining that the first network node device cannot transmit the second data protocol packet to the first user communication device over an established bearer between the first network node device and the first user communication device; and wherein forwarding the second data protocol packet to the second network node device comprises forwarding the second data protocol packet to the second network node device responsive to determining that the first network node device cannot transmit the second data protocol packet to the first user communication device over the established bearer between the first network node device and the first user communication device.

5. The method as claimed in claim 3, wherein forwarding the second data protocol packet to the second network node device to deliver to the first user communication device comprises:

determining that the first network node device cannot transmit the second data protocol packet to the first user communication device over a first bearer established between the first network node device and the first user communication device;

responsive to determining that the first network node device cannot transmit the second data protocol packet to the first user communication device, forwarding the second data protocol packet to the second network node device to transmit to the first user communication device over a second bearer established between the first user communication device and the second network node device.

6. The method as claimed in claim 5, wherein determining that the first network node device cannot transmit the second data protocol packet to the first user communication device comprises determining that the first network node device cannot transmit the second data protocol packet to the first user communication device over the first bearer based on a load associated with an air-interface associated with the first bearer.

7. The method as claimed in claim 1, wherein modifying the data protocol packet to comprise an indicator that indicates the data protocol packet as one of an uplink protocol packet or as a downlink data protocol packet comprises modifying the data protocol packet to comprise an indicator that indicates the data protocol packet as an uplink protocol packet.

8. The method as claimed in claim 1, wherein the data protocol comprises Packet Data Convergence Protocol (PDCP).

9. A computer program product for a first network node device for multi-connectivity handling in a communication system, the computer program product comprising a non-transitory computer readable storage medium storing computer program code, which, when executed on at least one processor on the first network node device causes the first network node device to perform the method according to claim 1.

10. A first network node device for multi-connectivity handling in a communication system, the first network node device comprising:

a processor and memory, the memory comprising executable instructions that when executed by the processor cause the processor to operate to:

receive, from a first communication device operating in the communication system, a data protocol packet comprising a first identifier identifying a first data protocol processing context of the data protocol packet and a second identifier identifying a second communication device as destination node for the data protocol packet;

determine that the data protocol packet is destined for the second communication device based on the second identifier;

modify the data protocol packet to comprise an indicator that indicates the data protocol packet as one of an uplink data protocol packet or as a downlink data protocol packet; and forward the modified data protocol packet to the second communication device.

11. The first network node device as claimed in claim 10, wherein the first communication device comprises a first user communication device and the second communication device comprises a second network node device.

12. The first network node device as claimed in claim 11, wherein the processor further operates to:

generate a second data protocol packet destined for the first user communication device, and include in the second data protocol packet a third identifier identifying a second data protocol processing context, a fourth identifier identifying the first network node device as the originating node, and a fifth identifier identifying the first user communication device as the destination node for the second data protocol packet; and forward the second data protocol packet to the second network node device deliverance to deliver to the first user communication device.

13. The first network node device as claimed in claim 12, wherein the processor further operates to:

determine that the first network node device cannot transmit the second data protocol packet to the first user communication device over an established bearer between the first network node device and the first user communication device; and forward the second data protocol packet to the second network node device responsive to the determination that the first network node device cannot transmit the second data protocol packet to the first user communication device over the established bearer between the first network node and the first user communication device.

14. The first network node device as claimed in claim 10, wherein the processor further operates to modify the data protocol packet to comprise an indicator that indicates the data protocol packet as an uplink protocol packet.

15. The first network node device as claimed in claim 10, wherein the data protocol comprises Packet Data Convergence Protocol (PDCP).

16. A method of multi-connectivity handling in a communication system, the method being performed in a second network node device, the method comprising:
receiving a data protocol packet,
determining a destination of the data protocol packet based on a first identifier and a second identifier in the data protocol packet, the first identifier identifying a data protocol processing context and the second identifier identifying a communication device operating in the communication system as the destination node of the data protocol packet;
modifying the data protocol packet to comprise an indicator that indicates the data protocol packet as one of an uplink protocol packet or as a downlink data protocol packet; and
forwarding the modified data protocol packet to the communication device.

17. The method as claimed in claim 16, wherein modifying the data protocol packet to comprise an indicator that indicates the data protocol packet as one of an uplink protocol packet or as a downlink data protocol packet comprises modifying the data protocol packet to comprise an indicator that indicates the data protocol packet as an uplink protocol packet.

18. The method as claimed in claim 16, wherein the communication device comprises a first network node device or a user communication device.

19. The method as claimed in claim 16, wherein the data protocol comprises Packet Data Convergence Protocol (PDCP).

20. A computer program product for a second network node device for multi-connectivity handling in a communication system, the computer program product comprising a non-transitory computer readable storage medium storing computer program code, which, when executed on at least one processor on the second network node device causes the second network node device to perform the method according to claim 16.

21. The method as claimed in claim 16, further comprising:
responsive to receiving the data protocol packet, determining a number of hops associated with the data protocol packet; and
determining to forward the data protocol packet to the communication device based on the determined number of hops.

22. A second network node device for multi-connectivity handling in a communication system, the second network node device comprising:
a processor and memory, the memory comprising executable instructions that when executed by the processor causes the processor to operate to:
receive a data protocol packet, and
determine a destination of the data protocol packet based on a first identifier and a second identifier in the data protocol packet, the first identifier identifying the data protocol processing context and the second identifier identifying a communication device operating in the communication system as the destination node of the data protocol packet;
modify the data protocol packet to comprise an indicator that indicates the data protocol packet as one of an uplink protocol packet or as a downlink data protocol packet; and
forward the modified data protocol packet to the communication device.

23. The second network node device as claimed in claim 22, wherein the processor further operates to modify the data protocol packet to comprise an indicator that indicates the data protocol packet as an uplink protocol packet.

24. The second network node device as claimed in claim 22, wherein the communication device comprises a first network node device or a user communication device.

25. The second network node device as claimed in claim 22, wherein the data protocol comprises Packet Data Convergence Protocol (PDCP).

26. A method of multi-connectivity handling in a communication system, the method being performed in a first communication device the method comprising:
generating a data protocol packet, and
including in the data protocol packet a first identifier identifying a data protocol processing context and a second identifier identifying a first network node device operating in the communication system as a destination node for the data protocol packet;
determining that the data protocol packet cannot be transmitted to the first network node device;
responsive to determining the data protocol packet cannot be transmitted to the first network node device, transmitting the data protocol packet to a second communication device operating in the communication system to forward the data protocol packet to the first network node device.

27. The method as claimed in claim 26, wherein the communication device comprises a first user communication device; and wherein the second communication device comprises one of a second network node device or a second user communication device.

28. The method as claimed in claim 26, wherein determining that the data protocol packet cannot be transmitted to the first network node device comprises one of:
determining that the data protocol packet cannot be transmitted to the first network node device based on a load associated with an air-interface associated with a bearer established between the first user communication device and the first network node device; or
determining that the data protocol packet comprises a re-transmission packet that is to be sent over a different bearer than a bearer established between the first user communication device and the first network node device.

29. The method as claimed in claim 26, wherein the data protocol comprises Packet Data Convergence Protocol (PDCP).

30. A computer program product for a first communication device for multi-connectivity handling in a communication system, the computer program product comprising a non-transitory computer readable storage medium storing computer program code, which, when executed on at least one processor on the first communication device causes the first communication device to perform the method according to claim 26.

31. A first communication device for multi-connectivity handling in a communication system, the first communication device comprising:
- a processor and memory, the memory comprising executable instructions that when executed by the processor causes the processor to operate to:
  - generate a data protocol packet, and
  - include in the data protocol packet a first identifier identifying a data protocol processing context and a a second identifier identifying the first network node device operating in the communication system as a destination node for the data protocol packet;
  - determine that the data protocol packet cannot be transmitted to the first network node device;
  - responsive to the determination that the data protocol packet cannot be transmitted to the first network node device, transmit the data protocol packet to a second communication device operating in the communication system to forward the data protocol packet to the first network node device.

32. The first communication device as claimed in claim 31, wherein the communication device comprises a first user communication device; and wherein the second communication device comprises one of a second network node device or a second user communication device.

33. The first communication device as claimed in claim 31, wherein the processor further operates to determine that the data protocol packet cannot be transmitted to the first network node device by:
- determining that the data protocol packet cannot be transmitted to the first network node based on a load associated with an air-interface associated with a bearer established between the first communication device and the first network node device; or
- determining that the data protocol packet comprises a re-transmission packet that is to be sent over a different bearer than a bearer established between the first communication device and the first network node device.

34. The communication device as claimed in claim 31, wherein the data protocol comprises Packet Data Convergence Protocol (PDCP).

* * * * *